US009645864B2

(12) United States Patent
Rothman et al.

(10) Patent No.: US 9,645,864 B2
(45) Date of Patent: May 9, 2017

(54) TECHNOLOGIES FOR OPERATING SYSTEM TRANSITIONS IN MULTIPLE-OPERATING-SYSTEM ENVIRONMENTS

(71) Applicant: Intel Corporation, Santa Clara, CA (US)

(72) Inventors: Michael A. Rothman, Puyallup, WA (US); Vincent J. Zimmer, Federal Way, WA (US); Zijian You, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 204 days.

(21) Appl. No.: 14/316,370

(22) Filed: Jun. 26, 2014

(65) Prior Publication Data
US 2015/0220353 A1 Aug. 6, 2015

Related U.S. Application Data

(60) Provisional application No. 61/936,610, filed on Feb. 6, 2014.

(51) Int. Cl.
G06F 15/00 (2006.01)
G06F 13/00 (2006.01)
G06F 9/54 (2006.01)
G06F 9/44 (2006.01)
G06F 9/48 (2006.01)

(52) U.S. Cl.
CPC .............. G06F 9/542 (2013.01); G06F 9/441 (2013.01); G06F 9/4418 (2013.01); G06F 9/48 (2013.01)

(58) Field of Classification Search
CPC ... G06F 11/1417; G06F 9/45533; G06F 9/455
USPC ........ 715/780, 784, 763–765, 840–843, 851, 715/779
See application file for complete search history.

(56) References Cited

U.S. PATENT DOCUMENTS

2002/0188887 A1* 12/2002 Largman ............. G06F 11/1417
714/13
2009/0287571 A1* 11/2009 Fujioka ............... G06F 9/45533
705/14.54
2012/0278750 A1* 11/2012 Abraham ................ G06F 9/455
715/779

(Continued)

Primary Examiner — Kevin Nguyen
(74) Attorney, Agent, or Firm — Barnes & Thornburg LLP

(57) ABSTRACT

Technologies for transitioning between operating systems include a computing device having a main memory and a data storage device. The computing device executes a first operating system and monitors for an operating system toggle event. The toggle event may be a software command, a hardware buttonpress, or other user command. In response to the toggle event, the computing device copies state data of the first operating system to a reserved memory area. After copying the state data, the computing device executes a second operating system. While the second operating system is executing, the computing device copies the state data of the first operating system from the reserved memory area to the data storage device. The computing device monitors for operating system toggle events during execution of the second operating system and may similarly toggle execution back to the first operating system. Other embodiments are described and claimed.

25 Claims, 3 Drawing Sheets

(56) References Cited

U.S. PATENT DOCUMENTS

2013/0024812 A1\* 1/2013 Reeves ................ G06F 3/1423
715/810

\* cited by examiner

TECHNOLOGIES FOR OPERATING SYSTEM TRANSITIONS IN MULTIPLE-OPERATING-SYSTEM ENVIRONMENTS

CROSS-REFERENCE TO RELATED U.S. PATENT APPLICATION

The present application claims priority under 35 U.S.C. §119(e) to U.S. Provisional Patent Application Ser. No. 61/936,610, entitled "DEEP CACHING OF TRANSITIONS IN DUAL OS ENVIRONMENTS," which was filed on Feb. 6, 2014.

BACKGROUND

Some computing devices ship with multiple operating systems (OSs) installed by the manufacturer. For example, a computing device may include both a general-purpose operating system such as Microsoft® Windows™ as well as a mobile-oriented operating system such as Android.™ Typical computing devices may support multiple operating systems in a dual-boot or multi-boot configuration. However, switching between operating systems in a multi-boot configuration may be lengthy and typically requires the unused operating system(s) to shut down and lose state. Some computing devices are capable of "toggling" between operating systems without losing active operating system state based on some event (e.g., a system event or a user-initiated event such as a hardware button press or a software command). Those computing devices may toggle between operating systems using power management features, for example by causing the active operating system to hibernate to disk (e.g., by entering the ACPI "S4" power management state). Such hibernation-based operating system toggling is typically referred to as "S4 toggle."

The ACPI "S3" power management state allows computing devices to enter a low-powered state while retaining the contents of volatile memory. Many recent processors, chipsets, and systems-on-chips (SoCs) are capable of a connected-standby power management state instead of the ACPI S3 sleep state. The connected-standby power management state may allow those computing devices to perform certain network tasks while in a low-powered state. Many current computing devices are not capable of entering the S3 sleep state. Additionally, if a computing device is placed into S3 mode, the power utilization benefits of connected standby may be lost.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
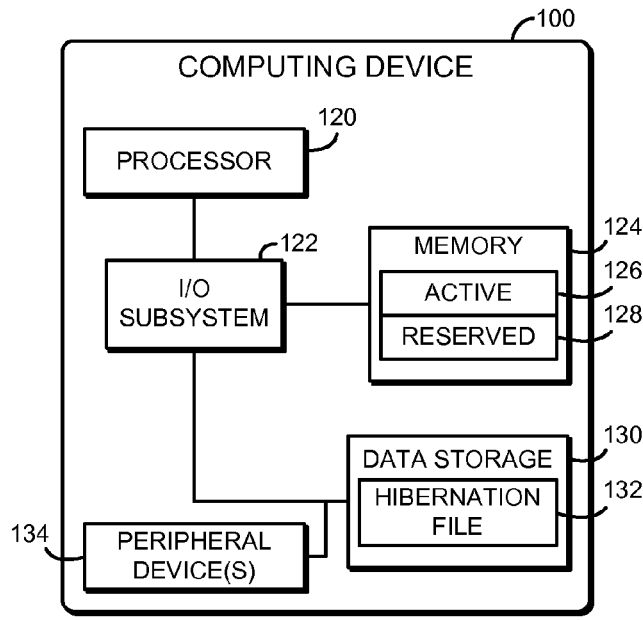
FIG. 1 is a simplified block diagram of at least one embodiment of a computing device for transitioning between operating systems.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative computing device 100 for transitioning between multiple operating systems includes a processor 120, an I/O subsystem 122, a memory 124, and a data storage device 130. In use, as described below, the computing device 100 is configured to execute multiple operating systems. During execution of one of the operating systems, the computing device 100 monitors for operating system toggle events. Operating system toggle events may be generated, for example, in response to a user selection (e.g., a software menu selection, a predefined keypress, a hardware button press, or any other user action). In response to an operating system toggle event, the computing device 100 copies state data of the active operating system to a reserved area of the memory 124 and subsequently launches another operating system. While the subsequent operating system executes, the computing device 100 copies the state data from the reserved area of the memory 124 to the data storage device 130. Copying state data to the memory 124 may reduce the amount of storage I/O required when toggling between operating systems and thus may improve performance, particularly for devices with a relatively slow or low-bandwidth data storage device 130. Additionally, copying state data to the memory 124 may be performed by current computing devices that are capable of the connected-standby power management state but incapable of the ACPI S3 sleep state.

Figure 2:
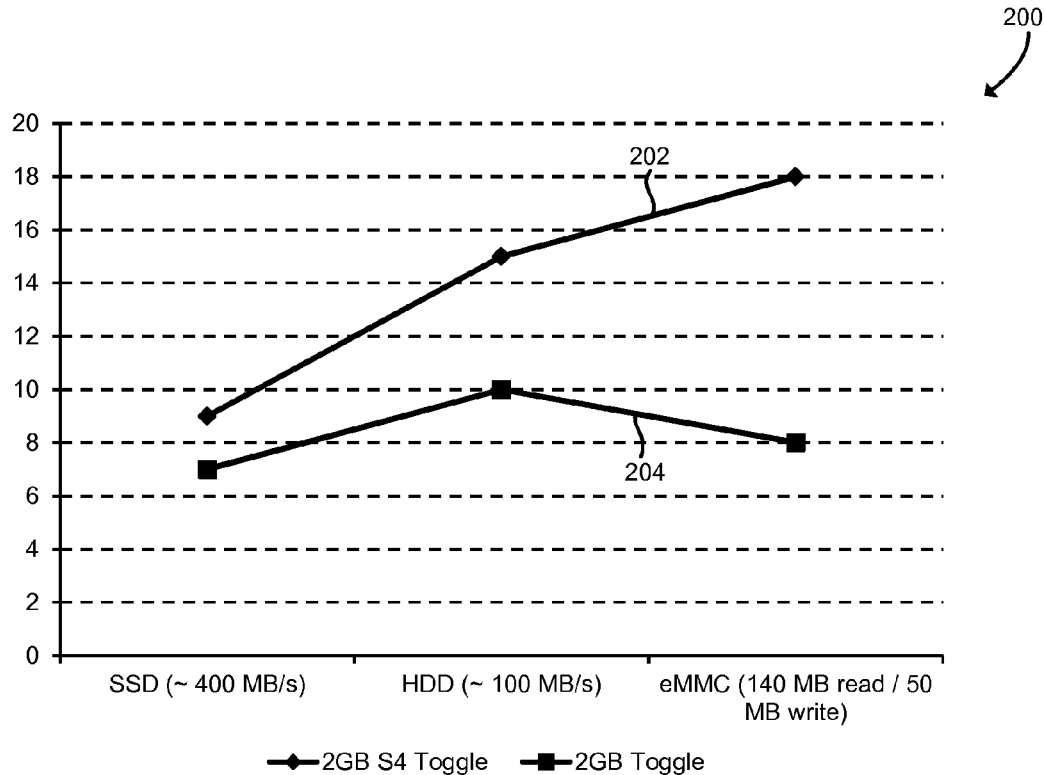
FIG. 2 is a plot illustrating operating system transition performance in various multiple-operating-system environments.

Referring now to FIG. 2, a plot 200 illustrates operating system toggle performance gains that may be achieved utilizing the present disclosure. The curve 202 illustrates toggle performance that may be exhibited by a typical computing device using an S4 toggle (i.e., entering the S4 ACPI hibernation state). The curve 202 illustrates the time that may be required to complete an S4 toggle for two gigabytes (2 GB) of main memory using several different types of data storage devices. The average amount of data required to be saved and/or restored during a typical S4 toggle may be less than 500 megabytes, but may vary. The S4 toggle times may reflect the average speed of storage I/O and the overhead incurred during the toggle plus approximately two seconds of switching time. As illustrated, the average S4 toggle times may be nine seconds for solid-state disks (SSDs), fifteen seconds for hard disk drives (HDDs), and eighteen seconds for eMMC (embedded flash media) in some embodiments. Thus, the time required for S4 toggling using a slower data storage device such as eMMC may be practically doubled compared to using an SSD. However, many deployed computing devices include slower data storage devices to reduce costs. Indeed, eMMC is used in many current tablet computing devices.

The curve 204 illustrates toggle performance that may be achieved by a computing device 100 according to the present disclosure. The curve 204 illustrates the time that may be required to toggle between operating systems for 2 GB of active main memory 124 and several different types of data storage devices 130. Similar to an S4 toggle, the average amount of data required to be saved and/or restored may be less than 500 megabytes, but may vary. As described above, the operating system toggle times may reflect the average speed of storage I/O and overhead during the toggle plus approximately two seconds of switching time. As illustrated, the average toggle times for the present disclosure may be seven seconds for SSDs, ten seconds for HDDs, and eight seconds for eMMC. Thus, as shown in FIG. 2, a computing device 100 according to the present disclosure may improve operating system toggle performance compared to a typical S4 toggle, particularly when using slower data storage devices 130 such as eMMC.

Referring back to FIG. 1, the computing device 100 may be embodied as any type of device capable of transitioning between operating systems and otherwise performing the functions described herein. For example, the computing device 100 may be embodied as, without limitation, a laptop computer, a notebook computer, a tablet computer, a smartphone, a mobile computing device, a wearable computing device, a computer, a desktop computer, a workstation, a server computer, a distributed computing system, a multi-processor system, a consumer electronic device, a smart appliance, and/or any other computing device capable of transitioning between operating systems. As shown in FIG. 1, the illustrative computing device 100 includes the processor 120, the I/O subsystem 122, the memory 124, and the data storage device 130. Of course, the computing device 100 may include other or additional components, such as those commonly found in a tablet computer (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. For example, the processor may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. The memory 124 is divided in an active memory area 126 and a reserved memory area 128. In operation, the active memory area 126 of the memory 124 may store various data and software used during operation of the computing device 100 such operating systems, applications, programs, libraries, and drivers. The reserved memory area 128 may be embodied as any portion of the memory 124 that is partitioned, protected, isolated, or otherwise reserved from general use by the operating systems, applications, or other processes executed by the computing device 100. In some embodiments, the active memory area 126 and the reserved memory area 128 may each include half of the memory 124. For example, in an embodiment with four gigabytes (4 GB) of main memory 124, the active memory area 126 and the reserved memory area 128 may each occupy two gigabytes (2 GB). In other embodiments any amount of memory 124 may be reserved. For example, in some embodiments the reserved memory area 128 may occupy less than half of the memory 124.

The memory 124 is communicatively coupled to the processor 120 via the I/O subsystem 122, which may be embodied as circuitry and/or components to facilitate input/output operations with the processor 120, the memory 124, and other components of the computing device 100. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the computing device 100, on a single integrated circuit chip.

The data storage device 130 may be embodied as any type of device or devices configured for short-term or long-term storage of data such as, for example, memory devices and circuits, memory cards, hard disk drives, solid-state drives, or other data storage devices. In some embodiments, the data storage device 130 may be embodied as an embedded flash memory module such as eMMC. The data storage device 130 may contain a hibernation file 132, which may be embodied as any file, file system, block, partition, or other segment of the data storage device 130 used to store device state while the computing device 100 is in a low-powered hibernation state (e.g., the ACPI S4 state). For example, the hibernation file 132 may store the contents of the memory 124, the state of the processor 120, and/or other device state. In some embodiments, the device state may be compressed, de-duplicated, or otherwise processed to reduce the size of the hibernation file 132. Upon awakening from the low-power hibernation state, the computing device 100 may copy the contents of the hibernation file 132 back into main memory 124 to resume operation.

In some embodiments, the computing device 100 may also include one or more peripheral devices 134. The peripheral devices 134 may include any number of additional input/output devices, interface devices, and/or other peripheral devices. For example, in some embodiments, the peripheral devices 134 may include a display, touch screen, graphics circuitry, keyboard, mouse, speaker system, and/or other input/output devices, interface devices, and/or peripheral devices. In particular, in some embodiments the peripheral devices 134 may include a dedicated hardware button or other control to toggle between operating systems.

Figure 3:
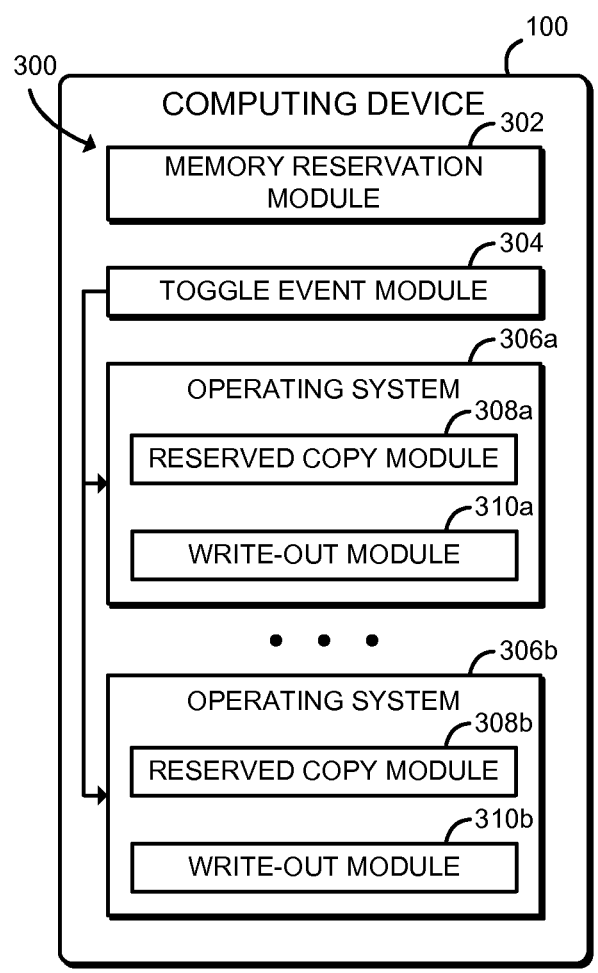
FIG. 3 is a simplified block diagram of at least one embodiment of an environment of the computing device of FIG. 1.

Referring now to FIG. 3, in the illustrative embodiment, the computing device 100 establishes an environment 300 during operation. The illustrative embodiment 300 includes a memory reservation module 302, a toggle event module 304, and a number of operating systems 306. The illustrative environment 300 includes two operating systems 306a, 306b; however, in other embodiments any number of operating systems 306 may be included. The various modules and/or components of the environment 300 may be embodied as hardware, firmware, software, or a combination thereof.

The memory reservation module 302 is configured to reserve a part of the memory 124 as the reserved memory area 128. After being reserved, the reserved memory area 128 may not be used by any of the operating systems 306, and in some embodiments may not be visible or accessible to any of the operating systems 306. In some embodiments, the memory reservation module 302 may be established by a pre-boot firmware execution environment of the computing device 100, such as a pre-boot firmware execution environment implemented according to the Unified Extensible Firmware Interface ("UEFI") specification, published by the UEFI Forum.

The toggle event module 304 is configured to receive operating system toggle events during execution of any of the operating systems 306. The toggle event module 304 is further configured to execute another operating system 306 after state data of the active operating system 306 has been copied to the reserved memory area 128. For example, in the illustrative embodiment the toggle event module 304 may execute the operating system 306b after state data of the operating system 306a has been copied to the reserved memory area 128. Although illustrated as a single toggle event module 304, in some embodiments the environment 300 may include several complementary toggle event modules 304, for example, one toggle event module 304 for each operating system 306.

Each operating system 306 may be embodied as any operating system, virtual machine monitor, hypervisor, or other control structure of the computing device 100. For example, the operating system 306a may be embodied as Microsoft® Windows™ and the operating system 306b may be embodied as Android.™ Each operating system 306 includes a reserved copy module 308 and a write-out module 310. Each of the reserved copy module 308 and the write-out module 310 may be embodied as a driver, process, loadable module, or other component executed by the operating system 306.

Each reserved copy module 308 is configured to copy state data of the associated operating system 306 to the reserved memory area 128. The state data may include the active contents of the memory 124; that is, the part of the memory 124 not included in the reserved memory area 128. Each write-out module 310 is configured to copy the contents of the reserved memory area 128 to the data storage device 130. The write-out module 310 may write to the data storage device 130 after the associated operating system 306 has been launched in response to an operating system toggle event. The write-out module 310 may write to the data storage device 130 while the associated operating system 306 executes user applications.

Figure 4:
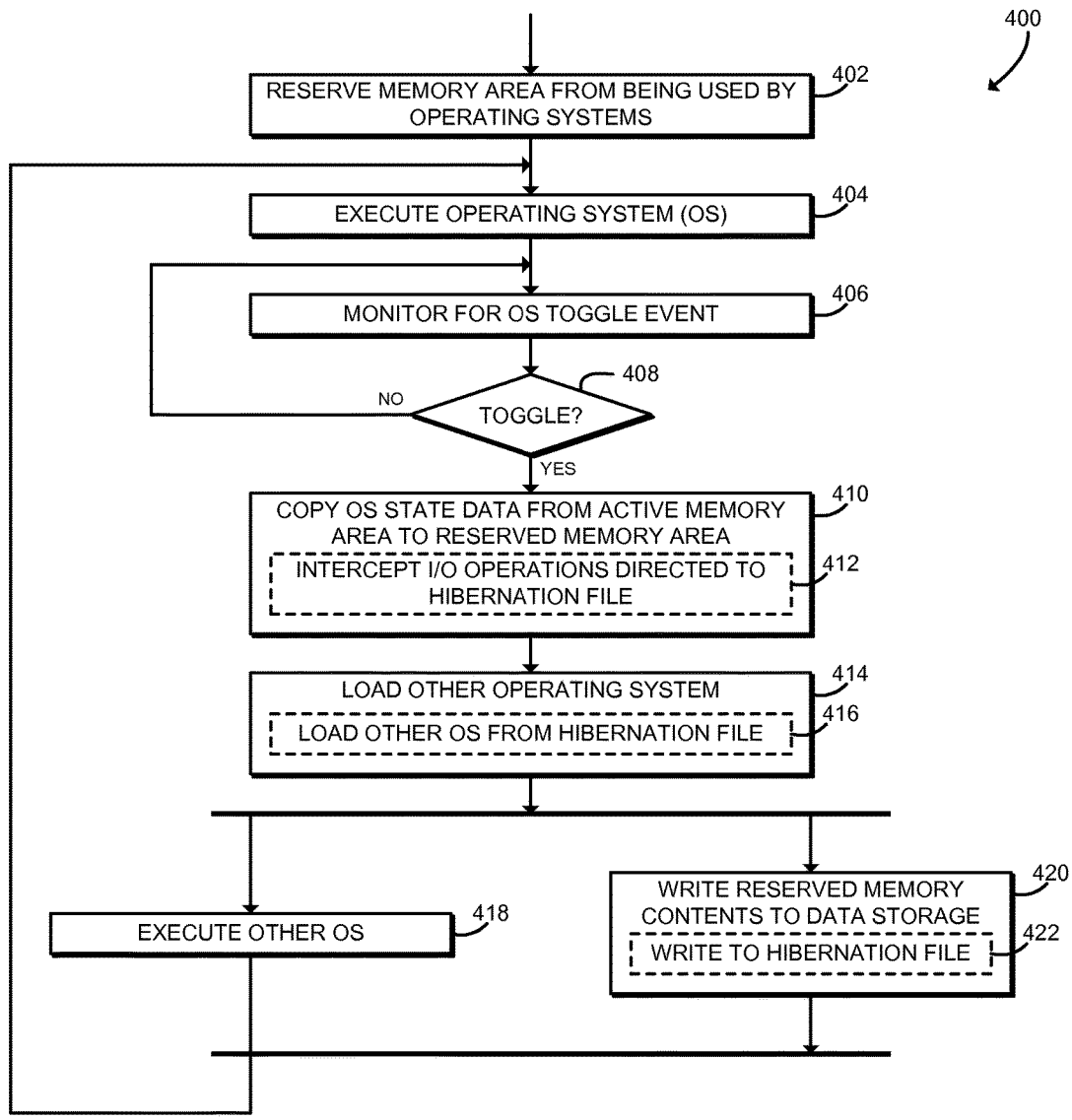
FIG. 4 is a simplified flow diagram of at least one embodiment of a method for transitioning between operating systems that may be executed by the computing device of FIGS. 1 and 3.

Referring now to FIG. 4, in use, the computing device 100 may execute a method 400 for toggling between operating systems 306. The method 400 begins in block 402, in which the computing device 100 reserves the reserved memory area 128 from being used by any of the operating systems 306. The computing device 100 may use any technique to protect, partition, isolate, or otherwise prevent the operating systems 306 from using the reserved memory area 128. In some embodiments, a pre-boot firmware environment of the computing device 100 may reserve the reserved memory area 128. For example, the pre-boot firmware may export one or more system tables to the operating systems 306 indicating the computing device 100 contains less memory than the amount actually included in the memory 124. In that example, the reserved memory area 128 may be embodied as the upper memory segment of the memory 124 not described by the system table.

In block 404, the computing device 100 executes one of the operating systems 306, illustratively referred to as the operating system 306a. The particular operating system 306a to be executed may be determined based on a user selection during an initial boot process, based on default policy of the computing device 100, or based on any other appropriate criteria. During execution of the operating system 306a, the computing device 100 may execute one or more applications as directed by the user. The active operating system 306a, applications, and any associated state data reside in the active memory area 126, that is, in the parts of the memory 124 that are not included in the reserved memory area 128.

In block 406, the computing device 100 monitors for an operating system toggle event. The operating system toggle event may be embodied as any event that causes the computing device 100 to switch execution to a different operating system 306. In some embodiments, the operating system toggle event may be generated by a user selection. For example, the user selection may be embodied as a user selection in a software interface, a predefined keypress or key combination, a hardware buttonpress, or other user-generated event. In some embodiments, the operating system toggle event may be generated by a system event without user intervention (e.g., in response to a request from a device driver, background software process, or other non-interactive process). In block 408, the computing device 100 determines whether an operating system toggle event has been received. If not, the method 400 loops back to block 406 to continue monitoring for operating system toggle events. If an operating system toggle event was received, the method 400 advances to block 410.

In block 410, the computing device 100 copies state data of the active operating system 306a from the active memory area 126 to the reserved memory area 128. In some embodiments, the computing device 100 may copy all of the active memory area 126 to the reserved memory area 128 (e.g., when the active memory area 126 and the reserved memory area 128 each occupy half of the total memory 124). Additionally or alternatively, the computing device 100 may copy only a portion of the active memory area 126, for example, only the contents of the active memory area 126 that define the state of the active operating system 306a. In some embodiments, the computing device 100 may compress, de-duplicate, or otherwise reduce the amount of data required to copy the state of the active operating system 306a to the reserved memory area 128. The computing device 100 may replace the contents of the reserved memory area 128, or in some embodiments, may preserve some or all of the contents of the reserved memory area 128, depending on the amount of state data of the active operating system 306a, the available space in the reserved memory area 128, or other factors. Thus, in some embodiments, the reserved memory area 128 may store state data for one or more operating systems 306, which may further improve toggle performance.

In some embodiments, in block 412 the computing device 100 may intercept one or more I/O operations directed to the hibernation file 132. Those I/O operations may be generated by the computing device 100 when entering a low-power hibernation power management state (e.g., the ACPI S4 state). After intercepting the I/O operations, the computing device 100 may route the I/O operations to the reserved memory area 128 rather than the hibernation file 132. For example, in some embodiments the storage driver stack of the operating system 306a may include a filter driver that intercepts and re-routes the I/O operations from the hibernation file 132 to the reserved memory area 128. Additionally or alternatively, in some embodiments the computing device 100 may establish a firmware driver to intercept the I/O operations. Thus, rather than saving the state of the operating system 306a to the data storage device 130 as in a typical hibernation power management state, the computing device 100 may transparently store the state of the operating system 306a to the reserved memory area 128. Accordingly, the computing device 100 may store the state of the operating system 306a to the reserved memory area 128 without requiring any particular modifications to the operating system 306a.

In block 414, the computing device 100 loads another operating system 306b. As described above, the particular operating system 306b to be executed may be determined based on a user selection, based on default policy of the computing device 100, or based on any other appropriate criteria. In some embodiments, in block 416, the computing device 100 may load the other operating system 306b from the hibernation file 132. For example, if the other operating system 306b had previously been executed by the computing device 100, the state of the other operating system 306b may have been stored in the hibernation file 132 in response to a previous operating system toggle event. Loading the state of the other operating system 306b from the hibernation file 132 may introduce some latency into the operating system toggle. However, because many data storage devices 130 have much higher data read speeds compared to data write speeds, operating system toggle performance may remain acceptable. For example, eMMC embedded flash memory modules may typically support read speeds that are three times faster than write speeds. As described above, in some embodiments the computing device 100 may also have previously stored state data of the operating system 306b in part of the reserved memory area 128. Loading the state of the other operating system 306b from the reserved memory area 128, if available, may further reduce latency for the operating system toggle.

After loading the other operating system 306b, execution of the method 400 proceeds concurrently to blocks 418 and 420. In block 418, the computing device 100 executes the other operating system 306b. As described above in connection with block 404, during execution of the other operating system 306b, the computing device 100 may execute one or more applications as directed by the user. The other operating system 306b may occupy all or part of the active memory area 126 previously occupied by the operating system 306a.

In block 420, the computing device 100 writes the contents of the reserved memory area 128 to the data storage device 130. In some embodiments, in block 422, the computing device 100 may write the contents of the reserved memory area 128 to the hibernation file 132. The computing device 100 writes to the data storage device 130 contemporaneously with execution of the other operating system 306b. For example, the computing device 100 may write to the data storage device 130 using a kernel driver, kernel thread, user process, user thread, or other entity capable of executing concurrently with other processes executed by the other operating system 306b. In some embodiments, the computing device 100 may write to the data storage device 130 in the background or when the computing device 100 is otherwise idle. For example, the computing device 100 may write to the data storage device 130 in a low-priority process or thread that is only executed when no other processes or threads are active (other than a system idle thread or similar idle thread). Thus, writing to the data storage device 130 may be imperceptible to the user of the computing device 100. Accordingly, the transfer time and other latency associated with the operating system toggle may be hidden from the user. As described above, hiding write latency may greatly improve toggle performance because many data storage devices 130 provide slow write speeds compared to read speeds. In some embodiments, the computing device 100 may disable, mask, or otherwise prevent further operating system toggle events while the contents of the reserved memory area 128 are copied to the data storage device 130.

After completing the copy of the contents of the reserved memory area 128 to the data storage device 130, the method 400 loops back to block 404, in which the other operating system 306b continues to execute. Thus, after completing the copy, the computing device 100 may monitor for and respond to further operating system toggle events, allowing the user to toggle back and forth between operating systems 306.

EXAMPLES

Illustrative examples of the technologies disclosed herein are provided below. An embodiment of the technologies may include any one or more, and any combination of, the examples described below.

Example 1 includes a computing device for transitioning between operating systems, the computing device comprising a main memory including a reserved memory area; a data storage device; and a toggle event module to receive, by the computing device, an operating system toggle event during execution of a first operating system to cause transition from the first operating system to a second operating system; wherein the first operating system comprises a first reserved copy module to copy state data of the first operating system to the reserved memory area in response to receipt of the operating system toggle event; the second operating system comprises a first write-out module to copy the state data of the first operating system to the data storage device during execution of the second operating system; and the toggle event module is further to execute the second operating system in response to copying of the state data to the reserved memory area.

Example 2 includes the subject matter of Example 1, and wherein the toggle event module is further to receive a second operating system toggle event during the execution of the second operating system; the second operating system further comprises a second reserved copy module to copy state data of the second operating system to the reserved memory area in response to receipt of the second operating system toggle event; the toggle event module is further to execute the first operating system a second time in response to copying of the state data of the second operating system; and the first operating system further comprises a second write-out module to copy the state data of the second operating system to the data storage device during the second execution of the first operating system.

Example 3 includes the subject matter of any of Examples 1 and 2, and wherein to receive the operating system toggle event comprises to receive an operating system toggle event in response to a system event.

Example 4 includes the subject matter of any of Examples 1-3, and wherein to receive the operating system toggle event comprises to receive an operating system toggle event in response to a user selection.

Example 5 includes the subject matter of any of Examples 1-4, and wherein to receive the operating system toggle event comprises to receive a hardware toggle selection.

Example 6 includes the subject matter of any of Examples 1-5, and wherein to receive the operating system toggle event comprises to receive a software toggle selection.

Example 7 includes the subject matter of any of Examples 1-6, and wherein the toggle event module is further to cause the computing device to enter a hibernation power management state in response to receipt of the operating system toggle event.

Example 8 includes the subject matter of any of Examples 1-7, and wherein to copy the state data of the first operating system to the reserved memory area comprises to intercept one or more I/O operations directed to the data storage device; and route the one or more I/O operations to the reserved memory area.

Example 9 includes the subject matter of any of Examples 1-8, and wherein to intercept the one or more I/O operations comprises to intercept one or more I/O operations directed to a hibernation file stored by the data storage device.

Example 10 includes the subject matter of any of Examples 1-9, and wherein to intercept the one or more I/O operations comprises to intercept one or more I/O operations using a filter driver of the first operating system.

Example 11 includes the subject matter of any of Examples 1-10, and wherein to execute the second operating system comprises to load the second operating system from a hibernation file stored by the data storage device.

Example 12 includes the subject matter of any of Examples 1-11, and wherein the second operating system is further to execute an application contemporaneously with the copying of the state data of the first operating system to the data storage device.

Example 13 includes the subject matter of any of Examples 1-12, and wherein to copy the state data of the first operating system to the data storage device further comprises to copy the state data when the computing device is idle.

Example 14 includes the subject matter of any of Examples 1-13, and wherein the data storage device comprises a hard disk drive, a solid-state drive, or an embedded flash memory module.

Example 15 includes the subject matter of any of Examples 1-14, and further including a memory reservation module to reserve a part of the main memory as the reserved memory area prior to execution of the first operating system.

Example 16 includes the subject matter of any of Examples 1-15, and wherein to reserve the part of the memory comprises to reserve the part of the memory using firmware of the computing device.

Example 17 includes a method for transitioning between operating systems, the method comprising executing, by a computing device, a first operating system of the computing device; receiving, by the computing device, an operating system toggle event while executing the first operating system; copying, by the computing device, state data of the first operating system to a reserved memory area of the computing device in response to receiving the operating system toggle event; executing, by the computing device, a second operating system of the computing device in response to copying the state data to the reserved memory area; and copying, by the computing device, the state data of the first operating system to a data storage device of the computing device in response to executing the second operating system.

Example 18 includes the subject matter of Example 17, and further including receiving, by the computing device, a second operating system toggle event while executing the second operating system; copying, by the computing device, state data of the second operating system to the reserved memory area in response to receiving the second operating system toggle event; executing, by the computing device, the first operating system a second time in response to copying the state data of the second operating system; and copying, by the computing device, the state data of the second operating system to the data storage device in response to executing the first operating system the second time.

Example 19 includes the subject matter of any of Examples 17 and 18, and wherein receiving the operating system toggle event comprises receiving an operating system toggle event in response to a system event.

Example 20 includes the subject matter of any of Examples 17-19, and wherein receiving the operating system toggle event comprises receiving an operating system toggle event in response to a user selection.

Example 21 includes the subject matter of any of Examples 17-20, and wherein receiving the operating system toggle event comprises receiving a hardware toggle selection.

Example 22 includes the subject matter of any of Examples 17-21, and wherein receiving the operating system toggle event comprises receiving a software toggle selection.

Example 23 includes the subject matter of any of Examples 17-22, and further including entering, by the computing device, a hibernation power management state in response to receiving the operating system toggle event.

Example 24 includes the subject matter of any of Examples 17-23, and wherein copying the state data of the first operating system to the reserved memory area comprises: intercepting one or more I/O operations directed to the data storage device; and routing the one or more I/O operations to the reserved memory area.

Example 25 includes the subject matter of any of Examples 17-24, and wherein intercepting the one or more I/O operations comprises intercepting one or more I/O operations directed to a hibernation file stored by the data storage device.

Example 26 includes the subject matter of any of Examples 17-25, and wherein intercepting the one or more I/O operations comprises intercepting one or more I/O operations using a filter driver of the first operating system.

Example 27 includes the subject matter of any of Examples 17-26, and wherein executing the second operating system comprises loading the second operating system from a hibernation file stored by the data storage device.

Example 28 includes the subject matter of any of Examples 17-27, and wherein copying the state data of the first operating system to the data storage device comprises copying the state data of the first operating system contemporaneously with executing the second operating system.

Example 29 includes the subject matter of any of Examples 17-28, and wherein executing the second operating system comprises executing an application contemporaneously with copying the state data of the first operating system to the data storage device.

Example 30 includes the subject matter of any of Examples 17-29, and wherein copying the state data of the first operating system to the data storage device further comprises copying the state data when the computing device is idle.

Example 31 includes the subject matter of any of Examples 17-30, and wherein copying the state data of the first operating system to the data storage device comprises copying the state data of the first operating system to a hard disk drive, a solid-state drive, or an embedded flash memory module of the computing device.

Example 32 includes the subject matter of any of Examples 17-31, and further including reserving, by the computing device, a part of a memory of the computing device as the reserved memory area prior to executing the first operating system.

Example 33 includes the subject matter of any of Examples 17-32, and wherein reserving the part of the memory comprises reserving the part of the memory using firmware of the computing device.

Example 34 includes a computing device comprising a processor; and a memory having stored therein a plurality of instructions that when executed by the processor cause the computing device to perform the method of any of Examples 17-33.

Example 35 includes one or more machine readable storage media comprising a plurality of instructions stored thereon that in response to being executed result in a computing device performing the method of any of Examples 17-33.

Example 36 includes a computing device comprising means for performing the method of any of Examples 17-33.

Example 37 includes a computing device for transitioning between operating systems, the computing device comprising means for executing a first operating system of the computing device; means for receiving an operating system toggle event while executing the first operating system; means for copying state data of the first operating system to a reserved memory area of the computing device in response to receiving the operating system toggle event; means for executing a second operating system of the computing device in response to copying the state data to the reserved memory area; and means for copying the state data of the first operating system to a data storage device of the computing device in response to executing the second operating system.

Example 38 includes the subject matter of Example 37, and further including means for receiving a second operating system toggle event while executing the second operating system; means for copying state data of the second operating system to the reserved memory area in response to receiving the second operating system toggle event; means for executing the first operating system a second time in response to copying the state data of the second operating system; and means for copying the state data of the second operating system to the data storage device in response to executing the first operating system the second time.

Example 39 includes the subject matter of any of Examples 37 and 38, and wherein the means for receiving the operating system toggle event comprises means for receiving an operating system toggle event in response to a system event.

Example 40 includes the subject matter of any of Examples 37-39, and wherein the means for receiving the operating system toggle event comprises means for receiving an operating system toggle event in response to a user selection.

Example 41 includes the subject matter of any of Examples 37-40, and wherein the means for receiving the operating system toggle event comprises means for receiving a hardware toggle selection.

Example 42 includes the subject matter of any of Examples 37-41, and wherein the means for receiving the operating system toggle event comprises means for receiving a software toggle selection.

Example 43 includes the subject matter of any of Examples 37-42, and further including means for entering a hibernation power management state in response to receiving the operating system toggle event.

Example 44 includes the subject matter of any of Examples 37-43, and wherein the means for copying the state data of the first operating system to the reserved memory area comprises means for intercepting one or more I/O operations directed to the data storage device; and means for routing the one or more I/O operations to the reserved memory area.

Example 45 includes the subject matter of any of Examples 37-44, and wherein the means for intercepting the one or more I/O operations comprises means for intercepting one or more I/O operations directed to a hibernation file stored by the data storage device.

Example 46 includes the subject matter of any of Examples 37-45, and wherein the means for intercepting the one or more I/O operations comprises means for intercepting one or more I/O operations using a filter driver of the first operating system.

Example 47 includes the subject matter of any of Examples 37-46, and wherein the means for executing the second operating system comprises means for loading the second operating system from a hibernation file stored by the data storage device.

Example 48 includes the subject matter of any of Examples 37-47, and wherein the means for copying the state data of the first operating system to the data storage device comprises means for copying the state data of the first operating system contemporaneously with executing the second operating system.

Example 49 includes the subject matter of any of Examples 37-48, and wherein the means for executing the second operating system comprises means for executing an application contemporaneously with copying the state data of the first operating system to the data storage device.

Example 50 includes the subject matter of any of Examples 37-49, and wherein the means for copying the state data of the first operating system to the data storage device further comprises means for copying the state data when the computing device is idle.

Example 51 includes the subject matter of any of Examples 37-50, and wherein the means for copying the state data of the first operating system to the data storage device comprises means for copying the state data of the first operating system to a hard disk drive, a solid-state drive, or an embedded flash memory module of the computing device.

Example 52 includes the subject matter of any of Examples 37-51, and further including means for reserving a part of a memory of the computing device as the reserved memory area prior to executing the first operating system.

Example 53 includes the subject matter of any of Examples 37-52, and wherein the means for reserving the part of the memory comprises means for reserving the part of the memory using firmware of the computing device.

The invention claimed is:

1. A computing device for transitioning between operating systems, the computing device comprising:
   a main memory including a reserved memory area;
   a data storage device; and
   a toggle event module to receive, by the computing device, an operating system toggle event during execution of a first operating system to cause transition from the first operating system to a second operating system;
   wherein the first operating system comprises a first reserved copy module to copy state data of the first operating system to the reserved memory area in response to receipt of the operating system toggle event;
   the second operating system comprises a first write-out module to copy the state data of the first operating system to the data storage device during execution of the second operating system; and
   the toggle event module is further to execute the second operating system in response to copying of the state data to the reserved memory area.

2. The computing device of claim 1, wherein:
   the toggle event module is further to receive a second operating system toggle event during the execution of the second operating system;
   the second operating system further comprises a second reserved copy module to copy state data of the second operating system to the reserved memory area in response to receipt of the second operating system toggle event;
   the toggle event module is further to execute the first operating system a second time in response to copying of the state data of the second operating system; and
   the first operating system further comprises a second write-out module to copy the state data of the second operating system to the data storage device during the second execution of the first operating system.

3. The computing device of claim 1, wherein to receive the operating system toggle event comprises to receive an operating system toggle event in response to a system event.

4. The computing device of claim 1, wherein to receive the operating system toggle event comprises to receive an operating system toggle event in response to a user selection.

5. The computing device of claim 4, wherein to receive the operating system toggle event comprises to receive a hardware toggle selection.

6. The computing device of claim 1, wherein the toggle event module is further to cause the computing device to enter a hibernation power management state in response to receipt of the operating system toggle event.

7. The computing device of claim 1, wherein to copy the state data of the first operating system to the reserved memory area comprises to:
   intercept one or more I/O operations directed to the data storage device; and
   route the one or more I/O operations to the reserved memory area.

8. The computing device of claim 7, wherein to intercept the one or more I/O operations comprises to intercept one or more I/O operations directed to a hibernation file stored by the data storage device.

9. The computing device of claim 1, wherein the second operating system is further to execute an application contemporaneously with the copying of the state data of the first operating system to the data storage device.

10. The computing device of claim 1, wherein to copy the state data of the first operating system to the data storage device further comprises to copy the state data when the computing device is idle.

11. The computing device of claim 1, further comprising a memory reservation module to reserve a part of the main memory as the reserved memory area prior to execution of the first operating system using firmware of the computing device.

12. A method for transitioning between operating systems, the method comprising:
   executing, by a computing device, a first operating system of the computing device;
   receiving, by the computing device, an operating system toggle event while executing the first operating system;
   copying, by the computing device, state data of the first operating system to a reserved memory area of the computing device in response to receiving the operating system toggle event;
   executing, by the computing device, a second operating system of the computing device in response to copying the state data to the reserved memory area; and
   copying, by the computing device, the state data of the first operating system to a data storage device of the computing device in response to executing the second operating system.

13. The method of claim 12, further comprising:
   receiving, by the computing device, a second operating system toggle event while executing the second operating system;
   copying, by the computing device, state data of the second operating system to the reserved memory area in response to receiving the second operating system toggle event;
   executing, by the computing device, the first operating system a second time in response to copying the state data of the second operating system; and
   copying, by the computing device, the state data of the second operating system to the data storage device in response to executing the first operating system the second time.

14. The method of claim 12, wherein receiving the operating system toggle event comprises receiving a hardware toggle selection.

15. The method of claim 12, further comprising entering, by the computing device, a hibernation power management state in response to receiving the operating system toggle event.

16. The method of claim 12, wherein copying the state data of the first operating system to the reserved memory area comprises:
intercepting one or more I/O operations directed to the data storage device; and
routing the one or more I/O operations to the reserved memory area.

17. The method of claim 12, wherein:
copying the state data of the first operating system to the data storage device comprises copying the state data of the first operating system contemporaneously with executing the second operating system; and
copying the state data of the first operating system to the data storage device further comprises copying the state data when the computing device is idle.

18. The method of claim 12, wherein reserving the part of the memory comprises reserving the part of the memory using firmware of the computing device.

19. One or more non-transitory, computer-readable storage media comprising a plurality of instructions that in response to being executed cause a computing device to:
execute a first operating system of the computing device;
receive an operating system toggle event while executing the first operating system;
copy state data of the first operating system to a reserved memory area of the computing device in response to receiving the operating system toggle event;
execute a second operating system of the computing device in response to copying the state data to the reserved memory area; and
copy the state data of the first operating system to a data storage device of the computing device in response to executing the second operating system.

20. The one or more non-transitory, computer-readable storage media of claim 19, further comprising a plurality of instructions that in response to being executed cause the computing device to:
receive a second operating system toggle event while executing the second operating system;
copy state data of the second operating system to the reserved memory area in response to receiving the second operating system toggle event;
execute the first operating system a second time in response to copying the state data of the second operating system; and
copy the state data of the second operating system to the data storage device in response to executing the first operating system the second time.

21. The one or more non-transitory, computer-readable storage media of claim 19, wherein to receive the operating system toggle event comprises to receive a hardware toggle selection.

22. The one or more non-transitory, computer-readable storage media of claim 19, further comprising a plurality of instructions that in response to being executed cause the computing device to enter a hibernation power management state in response to receiving the operating system toggle event.

23. The one or more non-transitory, computer-readable storage media of claim 19, wherein to copy the state data of the first operating system to the reserved memory area comprises to:
intercept one or more I/O operations directed to the data storage device; and
route the one or more I/O operations to the reserved memory area.

24. The one or more non-transitory, computer-readable storage media of claim 19, wherein:
to copy the state data of the first operating system to the data storage device comprises to copy the state data of the first operating system contemporaneously with executing the second operating system; and
to copy the state data of the first operating system to the data storage device further comprises to copy the state data when the computing device is idle.

25. The one or more non-transitory, computer-readable storage media of claim 19, wherein to reserve the part of the memory comprises to reserve the part of the memory using firmware of the computing device.

* * * * *